UNITED STATES PATENT OFFICE.

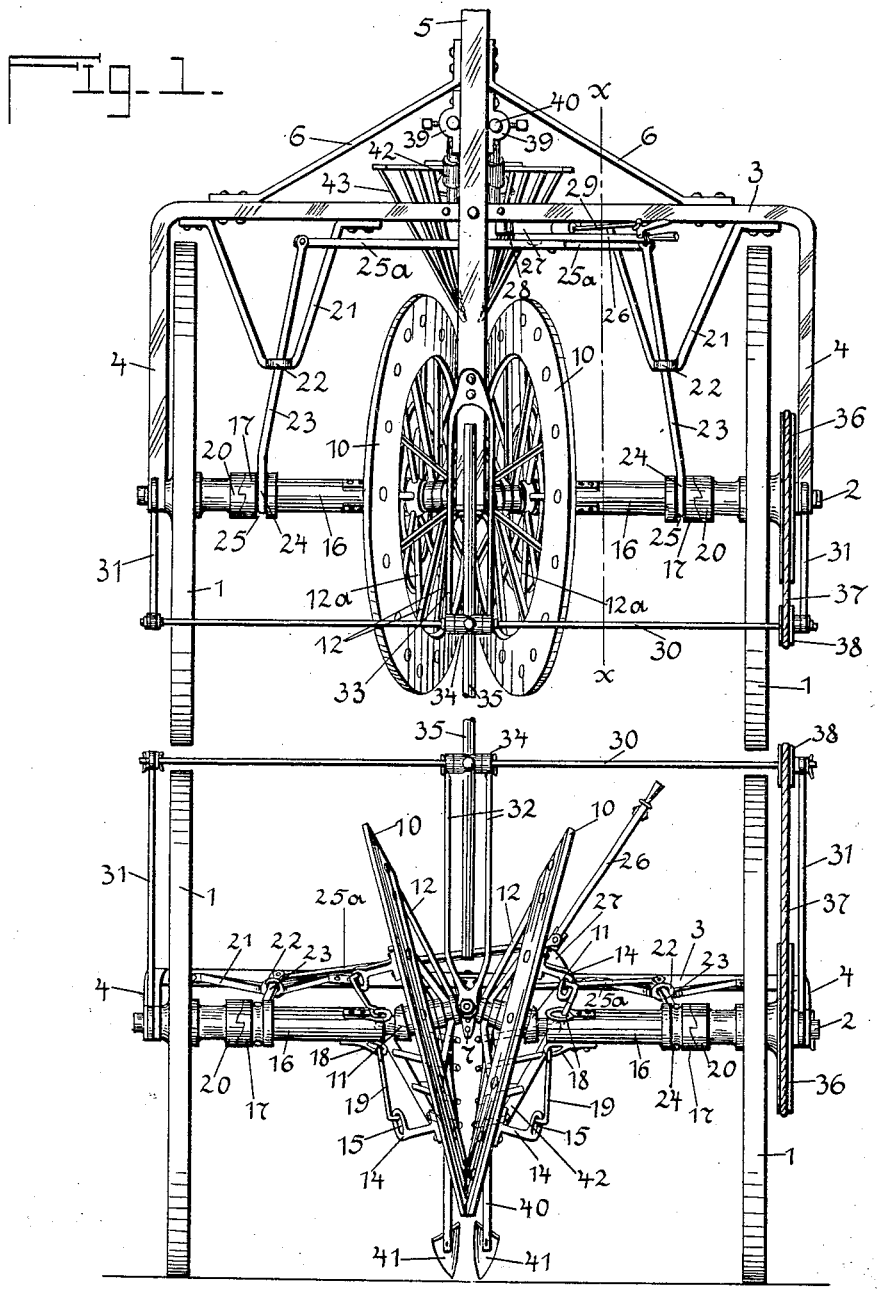

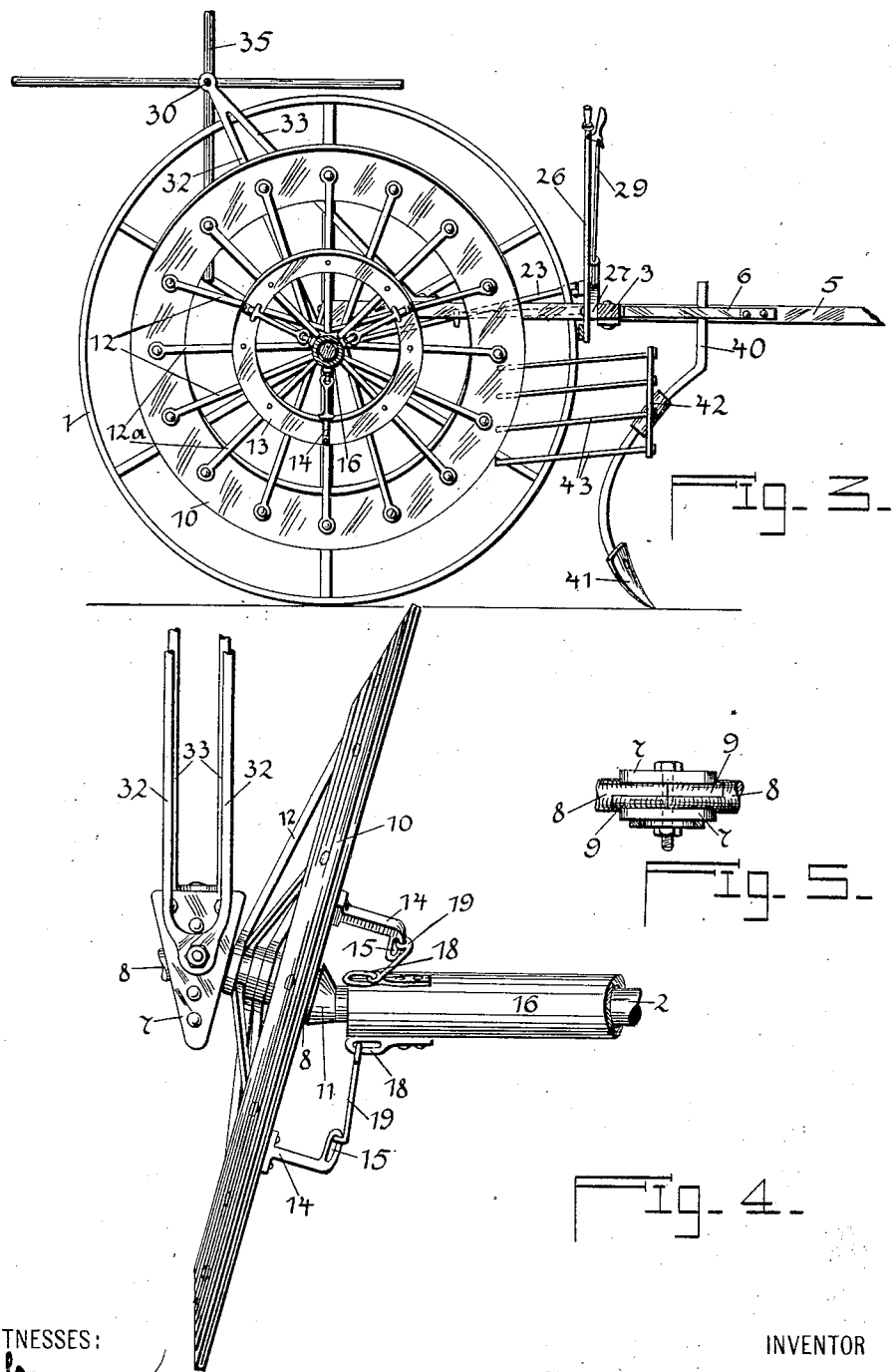

JOHN B. MARSHEL, OF DALLAS, TEXAS.

COTTON-STALK PULLER.

1,042,704.  Specification of Letters Patent.  Patented Oct. 29, 1912.

Application filed June 27, 1911. Serial No. 635,611.

*To all whom it may concern:*

Be it known that I, JOHN B. MARSHEL, a citizen of the United States, residing at Dallas, in the county of Dallas and State of Texas, have invented certain new and useful Improvements in Cotton-Stalk Pullers, of which the following is a specification.

My invention relates to new and useful improvements in cotton stalk pullers. Its object is to provide a wheeled farm implement that may be drawn by horse power along a row of cotton stalks and will pull the stalks out of the ground as it passes over them.

The object of the invention is more specifically to provide a stalk puller consisting in a wheeled farm implement having a pair of wheels rotatably mounted with their axes of rotation intersecting at an angle, the rims of the wheels being in contact at their lowest portions, and rotation being communicated to said wheels from the transporting wheels, the forward motion of the machine causing the stalks to be caught between the intersecting wheels and drawn from the ground through the rotation of said wheels.

Finally the object of the invention is to provide a device of the character described that will be strong, durable, simple and efficient and comparatively easy to construct, and also one that will not be likely to get out of working order.

With these and various other objects in view, my invention has relation to certain novel features of the construction and operation, an example of which is described in the following specification and illustrated in the accompanying drawings, wherein:

Figure 1 is a top view of the complete machine. Fig. 2 is a rear view thereof. Fig. 3 is a longitudinal sectional view taken upon the line $x$—$x$ of Fig. 1. Fig. 4 is a detail view of one of the friction wheels between which the stalks are drawn from the ground, showing the mechanism employed to communicate rotation to said wheels. Fig. 5 is a detail top view, showing the form of joint employed to connect the two members of the axle.

Referring now more particularly to the drawing, wherein like numerals of reference designate similar parts in all the figures, the numeral 1 denotes the transporting wheels, which are loose upon the extremities of an axle 2. The axle projects slightly beyond the wheels at each end and the projecting portions are fixed in a frame having the form of a horizontal arch consisting of a member 3, extending transversely in front of the wheels, and lateral members 4, extending rearwardly and receiving the axle in their rear extremities. The tongue 5 is mounted centrally upon the member 3 of the frame, and its connection with said member is strengthened by a pair of braces 6. The tongue extends rearwardly some distance beyond the member 3, and has its rear end rigidly attached to the center of the axle by a plate 7. Two journals 8 are formed upon the axle at each side of its center by inclining the portions adjacent to the center slightly upward, and giving them also a very slight forward inclination. The axle consists of two parts equal in length, each having at its inner end one of the inclined journal portions 8, which portions are secured together by the same bolt employed to attach the plate 7 to the axle. The joint between the two axle members is formed by reducing the ends of the inclined portions 8 to a semi-cylindrical shape, and fitting together the tongues 9 thus formed, with their plane surfaces in contact. A wheel 10 is mounted upon each journal 8, said wheels having rims of frusto-conical shape, which come into contact at a vertical line slightly to the rear of their lowest point. The width of the rims taken on their conical surfaces is considerably greater than their thickness, so that the line of contact is comparatively long. A portion 11 of each axle member is upset at the juncture of the member with the journal 8, said portions 11 forming set collars to receive the outward lateral thrust of the wheels 10. Each of the wheels 10 is provided with two sets of spokes, one set denoted by the numeral 12 being parallel with the conical surface of the rim, and the other set 12ª perpendicular with the inclined journal 8, and upon each of the latter sets is rigidly mounted a ring 13, concentric with the wheel. The rings 13 each carry three brackets 14 equidistantly spaced, the outer ends of said brackets being turned downward toward the axle, and each being provided with a slot 15.

Upon each axle member a sleeve 16 is mounted loose, having clutch teeth 17 at its outer end, and having fixed upon its inner end three rings 18, from each of which a swinging rod 19 extends to the slotted end of one of the brackets 14. The loose connection between each sleeve 16 and the adjacent wheel 10 thus established makes it possible for the sleeve when rotating upon the axle to communicate rotation to the wheel 10, mounted at an inclination with the axle. Each transporting wheel 1 is provided with an inwardly projecting hub carrying clutch teeth 20, which may be made to engage the clutch teeth 17 of the sleeve 16, by subjecting the latter to a sliding displacement. A lever mechanism, by which the clutches may be simultaneously thrown into or out of gear will now be described.

A pair of V-shaped brackets 21 are mounted upon the frame member 3 at each side of the tongue, the two extremities of each bracket being attached to said member and the inclined portions thereof being extended rearwardly. At the rear end of each bracket 21 there is carried a vertical ring 22 parallel with the axle and a horizontal lever 23 is passed freely through each ring, being adapted to undergo a pivotal motion therein. The rear extremity of each lever 23 is provided with a yoke 24, which is engaged in the usual manner in a groove 25 in the clutch collar 17 carried by the sleeve 16. From the forward extremities of the levers 23, connecting rods 25ª are extended transversely toward the middle of the machine, their inner extremities being pivotally secured to a manipulating lever 26 pivoted at its lower end upon the member 3 of the frame. The rods 25ª are attached to the lever 26 at equal distances above and below the pivotal point of the latter, so that when the lever is swung back and forth it causes the rods 25ª to be displaced in opposite directions, and makes it possible for both clutches to be opened or closed simultaneously. The usual means are provided to hold the lever 26 in its two positions of adjustment, consisting of a quadrant 27 having a groove 28 at each end of its curved surface, and a spring pressed rod 29 slidably mounted upon the lever, and having its lower extremity adapted to engage in the grooves 28.

Above the rear portion of the wheels 10, a shaft 30 is rotatably mounted parallel to the axle, the length of said shaft being approximately equal to that of the axle. The extremities of said shaft are supported by a pair of rods 31 extending upwardly and rearwardly from the axle extremities. The shaft 30 is also supported at its center by two brackets denoted by the numerals 32 and 33 respectively, the former having its lower end rigidly secured to the plate 7, and the latter having its lower end rigidly mounted upon the tongue some distance from the rear end thereof. Each of the brackets 32 and 33 consist of two parallel arms joined together at their lower extremities, and receiving the shaft 30 in their upper extremities. Between the upper extremities of each pair of arms 32 and 33 there is mounted a collar 34 fast upon the shaft 30, and provided with a number of radial arms 35. When rotation is communicated to the shaft 30, the frame, formed by the parts 34 and 35, is rotated, the arms 35 passing in their rotation between the component members of the two brackets 32 and 33, and passing also through the space between the wheels 10. Rotation may be communicated to the shaft 30 from one of the transporting wheels, a pulley 36 being mounted upon the hub of said wheel, and a cord 37 being passed over said pulley and over a smaller pulley 38 carried upon an extremity of the shaft 30.

Just in front of the frame member 3 a pair of brackets 39 are mounted upon the tongue 5 at each side thereof, and in each bracket there is rigidly secured the upper extremity of a curved plow shank 40. These plow shanks are curved rearwardly and downwardly, and at their lower extremities are given a slight forward curve. The plows, which are rigidly supported on the lower end of each shank, are denoted by the numeral 41. Upon the middle portion of each shank 40 is mounted a bracket 42 extending outwardly and upwardly, and from each bracket 42 a number of rods or stiff horizontal wires 43 project in a rearward direction. The rear extremities of the wires projecting from each bracket 42 are in vertical alinement, so that the uppermost wires are inclined slightly inward. The wires 43 act as guides to direct the stalks into the space between the divergent wheels 10.

From the above description, the manner in which the machine operates will be apparent. It is intended that the stalk puller travel centrally over a row, so that the tongue of the machine will be directly above the stalk. The plows 41, which are adjustable in height, and also in their inclination toward each other, will loosen the ground at each side of the row of stalks, so that the latter may be more easily pulled up. As the machine travels along the row, the stalks guided by the wires 43 will pass between the wheels 10 one after another. At the point of contact of the two wheels the stalks will become wedged, and will be subjected to a rearward and upward pull due to the rotation of said wheels. The will thus be drawn from the ground and will be dislodged from between the wheels by the rotating arms 35. In traveling to or from a field the clutches will be preferably disengaged in order to lessen the draft, and also prevent pulling up any plants which may be encountered by the machine in its travel.

In the present practice the field of stalks left standing after a crop of cotton has been picked are generally chopped down, the roots being later removed during the plowing of the field. This plan is objectionable since the stalks are often quite tough, and render the plowing difficult. Also, in order to destroy the boll weevil, it is very desirable that the cotton stalks be entirely burnt up after each crop has been picked.

By pulling the stalks completely up in the manner above described they may be later raked into a pile and burnt, thus leaving the field entirely unobstructed and making the existence of the boll weevil practically impossible.

It is obvious that various changes might be made in the details and proportion of parts of the above described invention without sacrificing the advantages or departing from the spirit thereof, and the device is, therefore, presented as including all such changes and modifications as may be covered by the following claims.

What I claim is:

1. In a device of the character described, the combination with a pair of transporting wheels, of an axle having said wheels loose upon its extremities, and having journals formed at each side of its center, intersecting at an angle, a pair of wheels mounted upon said journals having their rims in contact at their lowest portions, and means for communicating rotation to said contiguous wheels from the transporting wheels.

2. In a device of the character described, the combination with a pair of transporting wheels, of an axle having said wheels loose upon its extremities, and having journals formed at each side of its center, intersecting at an angle, a pair of wheels mounted upon said journals having their rims in contact at their lowest portions, means for communicating rotation to the said contiguous wheels from the transporting wheels, and means carried at the front of the wheeled frame adapted to guide the stalks between the contiguous wheels.

3. In a device of the character described, the combination with a pair of transporting wheels, of an axle having said wheels loose upon its extremities, and having journals formed at each side of its center, intersecting at an angle, a pair of wheels mounted upon said journals having their rims in contact at their lowest portions, and a plurality of swinging links establishing a communication of rotation between each of the contiguous wheels and the axle.

4. In a device of the character described, the combination with a pair of transporting wheels, of an axle having said wheels loose upon its extremities, and having journals formed at each side of its center, intersecting at an angle, a pair of wheels mounted upon said journals having their rims in contact at their lowest portions, a plurality of swinging links establishing a communication of rotation between each of the contiguous wheels and the axle, and means carried at the front of the wheeled frame adapted to guide the stalks between the contiguous wheels.

5. In a device of the character described, the combination with a pair of transporting wheels, of an axle having said wheels loose upon its extremities, and having journals formed at each side of its center intersecting at an angle, a pair of wheels mounted upon said journals having their rims in contact at their lowest portions, means for communicating rotation to said contiguous wheels from the transporting wheels, a shaft transversely mounted above the contiguous wheels, a frame rigidly mounted upon said shaft having members projecting between the wheels, means for communicating rotation to the transverse shaft from one of the transporting wheels, and means carried at the front of said frame adapted to guide the stalks between the contiguous wheels.

In testimony whereof I have signed my name to this specification in the presence of two subscribing witnesses.

JOHN B. MARSHEL.

Witnesses:
L. MORRIS,
J. S. MURRAY.

---

Copies of this patent may be obtained for five cents each, by addressing the "Commissioner of Patents, Washington, D. C."